(12) United States Patent
Kowalski

(10) Patent No.: US 7,681,092 B2
(45) Date of Patent: Mar. 16, 2010

(54) SYSTEMS AND METHODS FOR INTERLEAVING AND DEINTERLEAVING DATA IN AN OFDMA-BASED COMMUNICATION SYSTEM

(75) Inventor: John M. Kowalski, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1007 days.

(21) Appl. No.: 11/401,662

(22) Filed: Apr. 11, 2006

(65) Prior Publication Data

US 2007/0250742 A1    Oct. 25, 2007

(51) Int. Cl.
*G06F 11/00* (2006.01)

(52) U.S. Cl. .................. 714/701; 714/779; 714/702; 714/762; 714/788; 375/260; 370/208

(58) Field of Classification Search ......... 714/701–702, 714/762, 779, 788; 375/260; 370/208
See application file for complete search history.

(56) References Cited

U.S. PATENT DOCUMENTS

| | | | | |
|---|---|---|---|---|
| 5,243,629 | A | * | 9/1993 | Wei ............................. 375/299 |
| 7,170,849 | B1 | * | 1/2007 | Arivoli et al. ................ 370/208 |
| 2002/0070796 | A1 | | 6/2002 | Gay-Bellile et al. |
| 2004/0141548 | A1 | * | 7/2004 | Shattil ......................... 375/146 |
| 2006/0115012 | A1 | * | 6/2006 | Sadowsky et al. ............ 375/260 |
| 2007/0147226 | A1 | * | 6/2007 | Khandekar et al. .......... 370/208 |
| 2007/0189404 | A1 | * | 8/2007 | Baum et al. .................. 375/260 |
| 2008/0137562 | A1 | * | 6/2008 | Li et al. ....................... 370/280 |

OTHER PUBLICATIONS

"Implementing OFDM Using Altera Intellectual Property," Mar. 2001, ver. 1.0, pp. 1-8.
"Part 11: Wireless LAN Medium Access Control (MAC) and Physical Layer (PHY) specifications," Adopted by the ISO/IEC and redesignated as ISO/IEC 8802-11:1999/Amd 1:2000(E), pp. 1-91.

* cited by examiner

*Primary Examiner*—Guy J Lamarre
(74) *Attorney, Agent, or Firm*—Austin Rapp & Hardman

(57) ABSTRACT

In an exemplary embodiment, a base station includes an antenna for transmitting signals on a downlink to a plurality of user devices. The base station also includes a processor, and memory in electronic communication with the processor. Interleaving instructions are stored in the memory. The interleaving instructions are executable by the processor to interleave coded data in accordance with an interleaving algorithm in order to generate interleaved data. The interleaving algorithm is configured to accommodate use of different transmission bandwidths for data transmission. OFDMA processing instructions are also stored in the memory. The OFDMA processing instructions are executable by the processor to perform OFDMA processing on the interleaved data. The OFDMA processing facilitates the use of a varying number of sub-carriers for channel transmission.

18 Claims, 10 Drawing Sheets

Parameters for downlink transmission scheme (FDD)

| Transmission BW | 1.25 MHz | 2.5 MHz | 5 MHz | 10 MHz | 15 MHz | 20 MHz |
|---|---|---|---|---|---|---|
| Sub-frame duration | 0.5 ms | | | | | |
| Sub-carrier spacing | 15 kHz | | | | | |
| Sampling frequency | 1.92 MHz (1/2 × 3.84 MHz) | 3.84 MHz | 7.68 MHz (2 × 3.84 MHz) | 15.36 MHz (4 × 3.84 MHz) | 23.04 MHz (6 × 3.84 MHz) | 30.72 MHz (8 × 3.84 MHz) |
| FFT size | 128 | 256 | 512 | 1024 | 1536 | 2048 |
| Number of occupied sub-carriers†, †† | 76 | 151 | 301 | 601 | 901 | 1201 |
| Number of OFDM symbols per sub frame (Short/Long Cyclic Prefix) | 7/6 | | | | | |
| Cyclic Prefix length (μs/samples) Short | (4.69/9) × 6, (5.21/10) × 1* | (4.69/18) × 6, (5.21/20) × 1 | (4.69/36) × 6, (5.21/40) × 1 | (4.69/72) × 6, (5.21/80) × 1 | (4.69/108) × 6, (5.21/120) × 1 | (4.69/144) × 6, (5.21/160) × 1 |
| Cyclic Prefix length (μs/samples) Long | (16.67/32) | (16.67/64) | (16.67/128) | (16.67/256) | (16.67/384) | (16.67/512) |

\*Includes DC sub-carrier which contains no data

† This is the assumption for the baseline proposal. Somewhat more carriers may be possible to occupy in case of the wider bandwidth †† {(x1/y1) × n1, (x2/y2) × n2} means (x1/y1) for n1 OFDM symbols and (x2/y2) for n2 OFDM symbols

FIG. 9

Number Of Coded Bits Per Transmission Bandwidth

| Transmission BW | 1.25 MHz | 2.5 MHz | 5 MHz | 10 MHz | 15 MHz | 20 MHz |
|---|---|---|---|---|---|---|
| Transmission Data Rates, coded bits per OFDM symbol | | | | | | |
| QPSK | 150 | 300 | 600 | 1200 | 1800 | 2400 |
| 16QAM | 600 | 1200 | 2400 | 4800 | 7200 | 9600 |
| 64QAM | 2400 | 4800 | 9600 | 19200 | 28800 | 38400 |

FIG. 10

SYSTEMS AND METHODS FOR INTERLEAVING AND DEINTERLEAVING DATA IN AN OFDMA-BASED COMMUNICATION SYSTEM

TECHNICAL FIELD

The present invention relates generally to computers and computer-related technology. More specifically, the present invention relates to systems and methods for interleaving and deinterleaving data in an OFDMA-based communication system.

BACKGROUND

A wireless communication system typically includes a base station in wireless communication with a plurality of user devices (which may also be referred to as mobile stations, subscriber units, access terminals, etc.). The base station transmits data to the users over a radio frequency (RF) communication channel. A multiple access scheme may be used to enable the users to share the communication channel without interference.

One example of a multiple access scheme that may be used is orthogonal frequency division multiple access (OFDMA). OFDMA is based on orthogonal frequency division multiplexing (OFDM). With OFDM, the transmission band of a communication channel is divided into a number of equally spaced sub-bands. A sub-carrier carrying a portion of the user information is transmitted in each sub-band, and every sub-carrier is orthogonal with every other sub-carrier. To facilitate multiple access in accordance with OFDMA, groups of sub-carriers may be assigned to different users.

The 3rd Generation Partnership Project (3GPP) is a collaboration of standards organizations throughout the world. The goal of 3GPP is to make a globally applicable third generation (3G) mobile phone system specification within the scope of the IMT-2000 (International Mobile Telecommunications-2000) standard as defined by the International Telecommunication Union. The technical work in 3GPP is organized in Technical Specification Groups (TSGs). One of the TSGs is the TSG Radio Access Network (RAN). TSG RAN is responsible for the definition of the functions, requirements and interfaces of the UTRA (UMTS Terrestrial Radio Access) network.

A proposal has been made to the 3GPP RAN-1 Working Group describing a physical layer structure for the UTRA downlink. (The term "downlink" refers to transmission from a base station to a user.) The proposal is titled "Physical Channels and Multiplexing in Evolved UTRA Downlink" (R1-050590) and is hereby incorporated by reference in its entirety. The proposed UTRA downlink utilizes OFDMA as its multiple access scheme.

One of the unique features of the proposed UTRA downlink is that it is capable of utilizing a varying number of sub-carriers for channel transmission. In other words, different users may be assigned a different number of sub-carriers. In addition, the number of sub-carriers that are assigned to a particular user may change over time. Thus, in accordance with the proposed UTRA downlink, data may be sent to different users at different transmission rates, and the data transmission rate for a particular user may change over time. This is in contrast to previous work in this area, which considered the number of sub-carriers (and hence the data transmission rate) to be fixed for all users.

Communication channels, being dispersive, are prone to block or burst errors if data is not spread uniformly over the transmission band. This is why in OFDM systems interleavers are commonly used to spread data over a multiplicity of sub-carriers, after forward error correction coding. However, to this point an interleaving/deinterleaving structure has not been defined for the proposed UTRA downlink. Accordingly, benefits may be realized by systems and methods for interleaving and deinterleaving coded data in an OFDMA-based system like the system in the proposed UTRA downlink, which is capable of utilizing a varying number of sub-carriers in order to facilitate the use of different transmission rates.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

FIG. 9 illustrates various parameters for a transmission scheme that has been proposed for the UTRA downlink;

FIG. 10 illustrates the number of coded bits per OFDM symbol for various transmission data rates;

DETAILED DESCRIPTION

Figure 1:
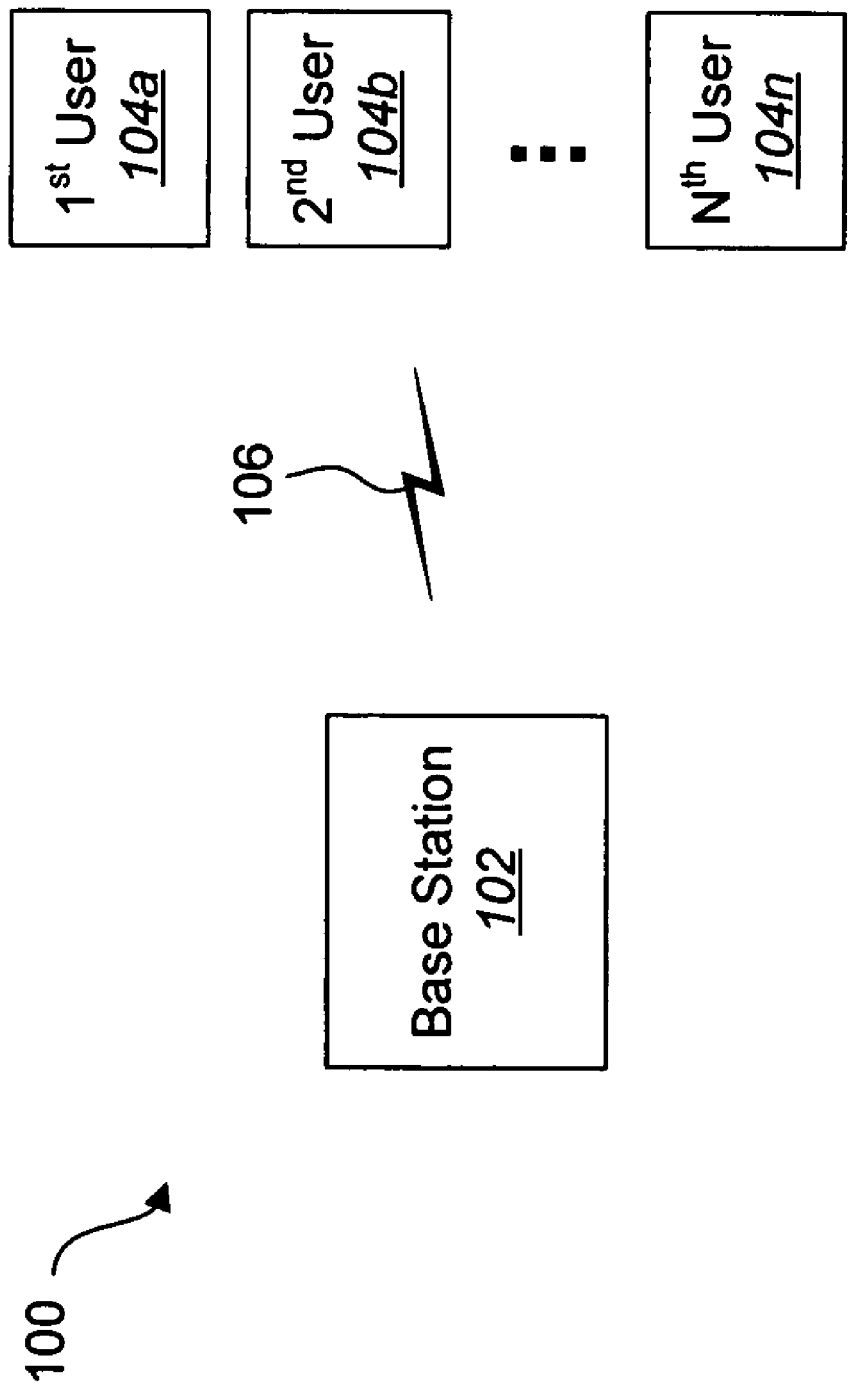
FIG. 1 illustrates an exemplary wireless communication system 100 in which embodiments may be practiced.

A base station that is configured to interleave coded data in an OFDMA-based system that uses a varying number of sub-carriers for channel transmission is disclosed. Such a base station may include an antenna for transmitting signals on a downlink to a plurality user devices. The base station may also include a processor and memory in electronic communication with the processor.

Interleaving instructions may be stored in the memory of the base station. The interleaving instructions may be executable by the processor to interleave coded data in accordance with an interleaving algorithm in order to generate interleaved data. The interleaving algorithm that is used may be configured to accommodate the use of different transmission bandwidths for data transmission. The interleaving algorithm may include one or more parameters whose value depends on transmission data rate information, sub-carrier information, and/or pilot channel information that is provided to the base station.

OFDMA processing instructions may also be stored in the memory. The OFDMA processing instructions may be executable by the processor to perform OFDMA processing on the interleaved data. The OFDMA processing facilitates the use of a varying number of sub-carriers for channel transmission.

Interleaving the coded data may involve pseudo-randomly and uniformly distributing coded bits within the coded data across a plurality of sub-carriers that have been designated for transmission of the coded data. Different OFDM symbols transmitted in accordance with the OFDMA-based system may comprise different numbers of coded bits, and interleaving may be performed on sets of coded data having different lengths. Interleaving a set of coded data may involve performing two interleaving permutations. A first interleaving permutation may map adjacent coded bits of the set of coded data into non-overlapping sub-carriers. A second interleaving permutation may map adjacent coded bits of the set of coded data onto less and more significant bits of a modulation constellation that is used to modulate the coded data.

A user device that is configured to deinterleave coded data in an OFDMA-based system that uses a varying number of sub-carriers for channel transmission is also disclosed. Such a user device may include an antenna for receiving signals on a downlink from a base station. The user device may also include a processor and memory in electronic communication with the processor.

OFDMA processing instructions may be stored in the memory of the user device. The OFDMA processing instructions may be executable by the processor to perform OFDMA processing on the received data in order to generate interleaved data. The OFDMA processing may facilitate the use of a varying number of sub-carriers for channel transmission Deinterleaving instructions may also be stored in the memory of the user device. The deinterleaving instructions may be executable by the processor to deinterleave the interleaved data in accordance with a deinterleaving algorithm in order to generate encoded data. The deinterleaving algorithm may be configured to accommodate the use of different transmission bandwidths for data transmission. The deinterleaving algorithm may include one or more parameters whose value depends on transmission data rate information, sub-carrier information, and/or pilot channel information that is provided to the base station.

Deinterleaving the received data may involve performing two deinterleaving permutations. A first deinterleaving permutation may reverse a second interleaving permutation that maps adjacent coded bits of a set of coded data onto less and more significant bits of a modulation constellation. A second deinterleaving permutation may reverse a first interleaving permutation that maps adjacent coded bits of the set of coded data into non-overlapping sub-carriers.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

FIG. 1 illustrates an exemplary wireless communication system 100 in which embodiments may be practiced. The system 100 shown in FIG. 1 is an example of a system 100 that may implement the proposed UTRA downlink. A base station 102 is in wireless communication with a plurality of user devices 104 (which, as indicated above, may also be referred to as mobile stations, subscriber units, access terminals, etc.). A first user device 104a, a second user device 104b, and an Nth user device 104n are shown in FIG. 1. The base station 102 transmits data to the user devices 104 over a radio frequency (RF) communication channel 106. The system 100 may utilize OFDMA to enable the users to share the communication channel 106 without interference.

Figure 2:
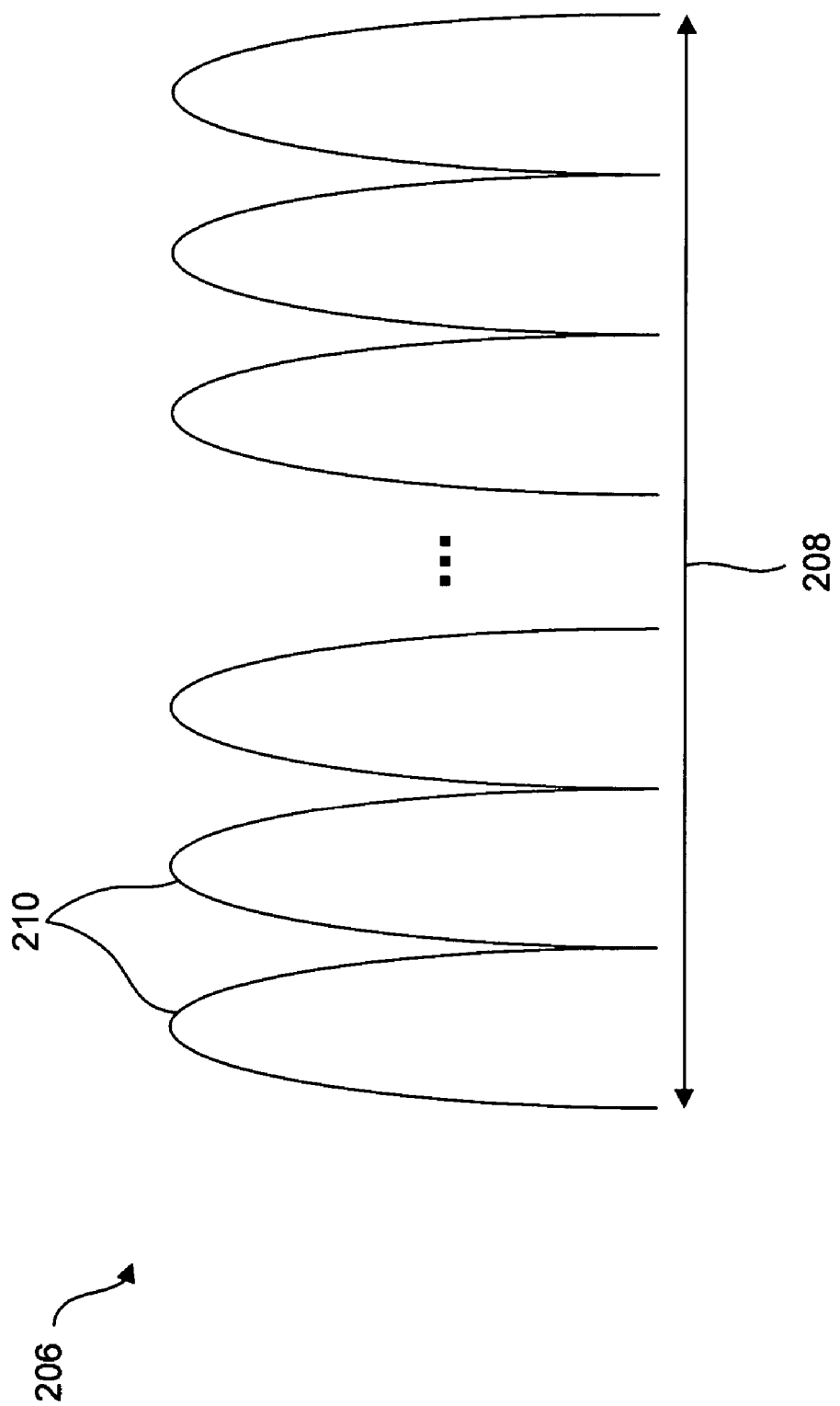
FIG. 2 illustrates characteristics of a transmission band of an RF communication channel in accordance with an OFDMA-based system.

FIG. 2 illustrates characteristics of a transmission band 208 of an RF communication channel 206 in accordance with an OFDMA-based system. As shown, the transmission band 208 may be divided into a number of equally spaced sub-bands 210. As mentioned above, a sub-carrier carrying a portion of the user information is transmitted in each sub-band 210, and every sub-carrier is orthogonal with every other sub-carrier. To facilitate multiple access in accordance with OFDMA, groups of sub-carriers (and, therefore, sub-bands 210) may be assigned to different user devices 104.

The UTRA downlink proposal discusses the concept of a "chunk" of sub-carriers. A chunk is a contiguous subset of sub-carriers. In accordance with the UTRA downlink proposal, different numbers of chunks of sub-carriers may be assigned to different user devices 104. In addition, the number of chunks of sub-carriers that are assigned to a particular user device 104 may change over time.

Figure 3:
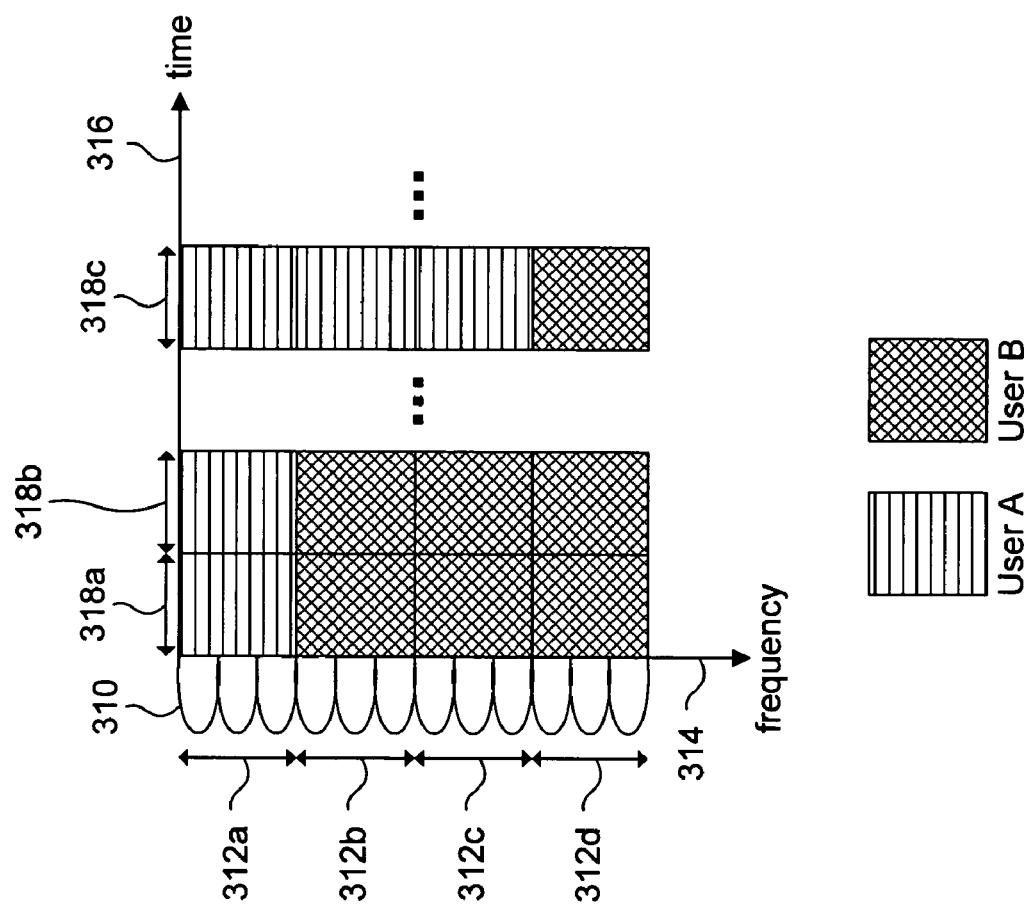
FIG. 3 illustrates an example showing how chunks of sub-carriers may be assigned to user devices in accordance with the UTRA downlink proposal.

FIG. 3 illustrates an example showing how chunks 312 of sub-carriers may be assigned to user devices 104 in accordance with the UTRA downlink proposal. A vertical axis 314 and a horizontal axis 316 are shown in FIG. 3. The horizontal axis 316 represents time. Transmission timing intervals (TTIs) 318 are shown along the horizontal axis 316. The vertical axis 314 represents frequency. Sub-bands 310 of a communication channel 106 are shown along the vertical axis 314. There are four chunks 312a, 312b, 312c, 312d of sub-carriers shown in FIG. 3.

In the first TTI 318a and the second TTI 318b shown in FIG. 3, one chunk 312a of sub-carriers is assigned to user A, whereas three chunks 312b, 312c, 312d of sub-carriers are assigned to user B. Thus, in the first TTI 318a and the second TTI 318b, the transmission data rate for user A is three times the transmission data rate for user A. In a subsequent TTI 318c, the number of chunks 312 that are assigned to user A and user B has changed, so that three chunks 312a, 312b, 312c of sub-carriers are assigned to user A, whereas only one chunk 312d of sub-carriers is assigned to user B.

In addition to implementing chunks of sub-carriers, the UTRA downlink proposal also calls for multiplexing pilot channels across the transmission band 208 of the communication channel 106. Two pilot channels are defined in the UTRA downlink proposal: a common pilot channel that is common to all user devices 104, and a dedicated pilot channel that is dedicated to a specific user device 104.

Figure 4:
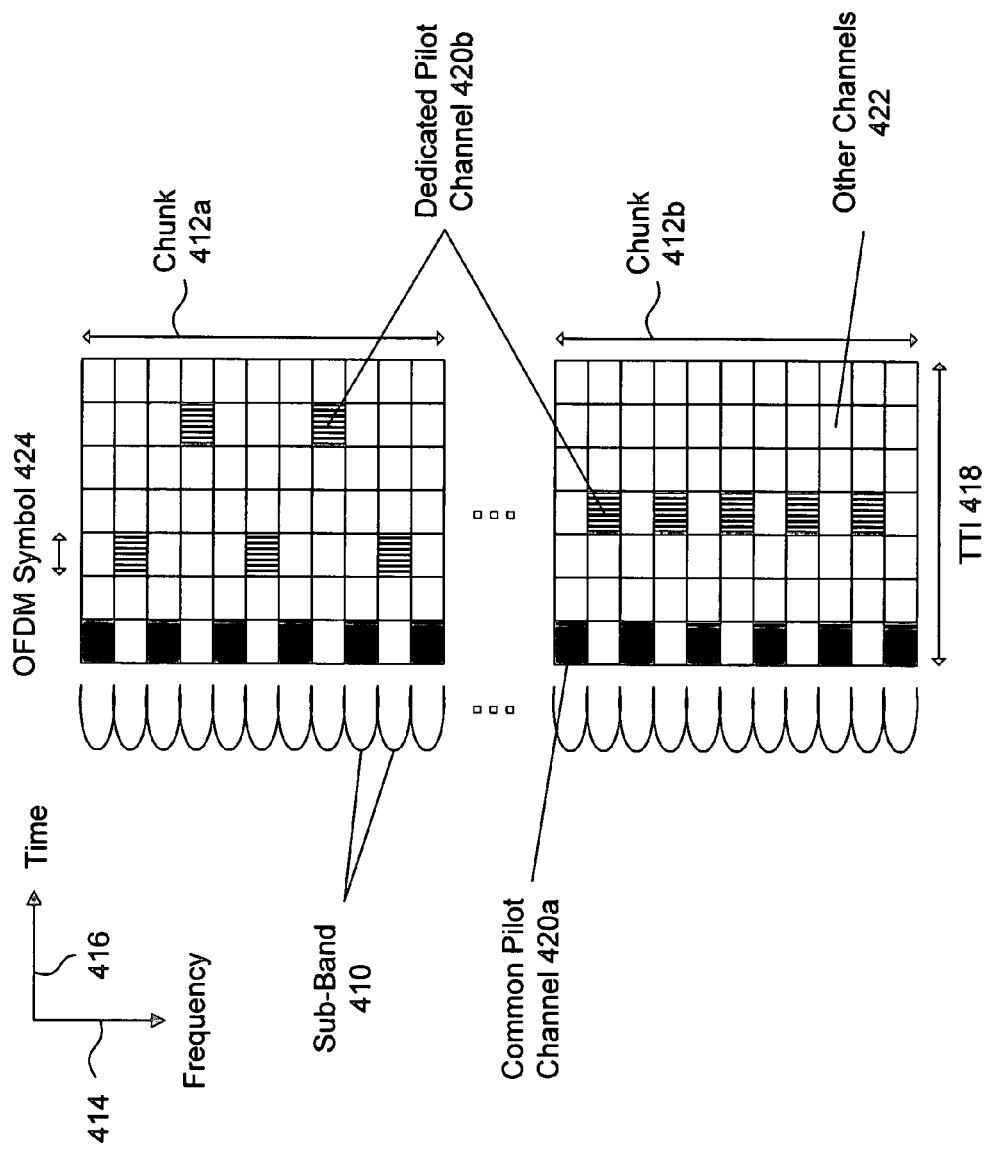
FIG. 4 illustrates an example showing how a common pilot channel and a dedicated pilot channel may be multiplexed with other channels in accordance with the UTRA downlink proposal.

FIG. 4 illustrates an example showing how a common pilot channel 420a and a dedicated pilot channel 420b may be multiplexed with other channels 422 in accordance with the UTRA downlink proposal. A vertical axis 414 and a horizontal axis 416 are shown in FIG. 4. The vertical axis 414 represents frequency. Sub-bands 410 of a communication channel 106 are shown along the vertical axis 414. The sub-bands 410 are divided into chunks 412a, 412b. The horizontal axis 416 represents time. A single TTI 418 is shown along the horizontal axis 316. In the depicted example, a single TTI 418 comprises multiple OFDM symbols 424.

Figure 5:
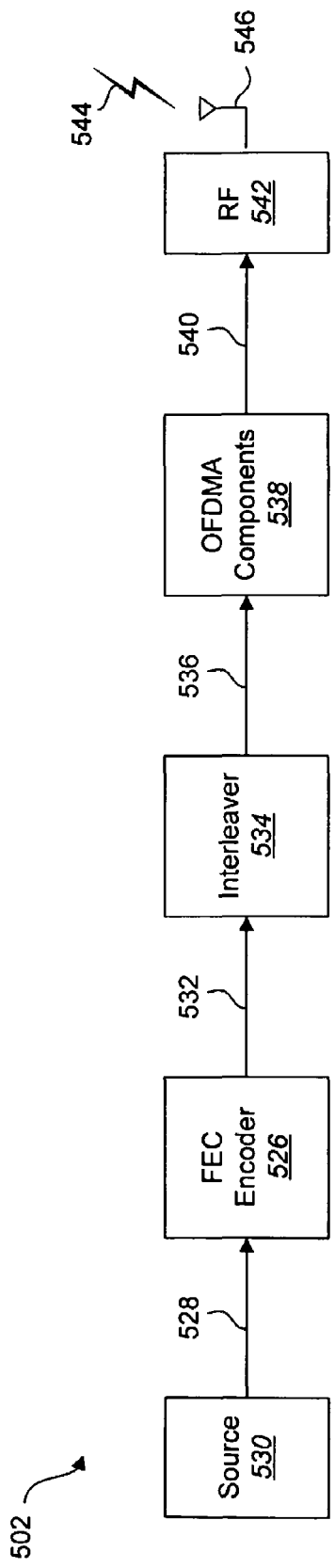
FIG. 5 illustrates various logical components that may be implemented in a base station that is configured to transmit wireless communication signals over a downlink to a plurality of user devices in accordance with OFDMA.

FIG. 5 illustrates various logical components that may be implemented in a base station 502 that is configured to transmit wireless communication signals over a downlink to a plurality of user devices 104 in accordance with OFDMA. The base station 502 shown in FIG. 5 includes a forward error correction (FEC) encoder 526. Data 528 from a data source 530 may be provided to the FEC encoder 526. The FEC encoder 526 encodes the data 528 in accordance with a predetermined FEC coding scheme. Examples of FEC coding schemes that may be used include block coding, convolutional coding, turbo coding, etc. The FEC encoder 526 outputs coded data 532.

The base station 502 shown in FIG. 5 also includes an interleaver 534. The interleaver 534 is used to help reduce burst errors within the RF communication channel 106. The coded data 532 that is output from the FEC encoder 526 is provided to the interleaver 534. The interleaver 534 interleaves the coded data 532 in accordance with a predetermined interleaving algorithm. An exemplary interleaving algorithm that may be used in accordance with an embodiment will be described below. The interleaver 534 outputs interleaved data 536.

The base station 502 shown in FIG. 5 also includes various components 538 that facilitate multiple access in accordance with OFDMA. These components 538 will be referred to as OFDMA components 538. The OFDMA components 538 may include, for example, a serial-to-parallel converter, a plurality of sub-carrier modulators (one for each sub-carrier), an inverse fast fourier transform (IFFT) unit, a parallel-to-serial converter, and so forth. The interleaved data 536 that is output from the interleaver 534 is provided to the OFDMA components 538 for OFDMA processing. The signal 540 that is output by the OFDMA components 538 will be referred to as an OFDMA signal 540.

The base station 502 shown in FIG. 5 also includes an RF transmitting unit 542. The OFDMA signal 540 that is output by the OFDMA components 538 is provided to the RF transmitting unit 542. The RF transmitting unit 542 performs RF processing on the OFDMA signal 540 in order to generate an RF signal 544 that is transmitted through a transmit antenna 546 over the air.

Figure 6:
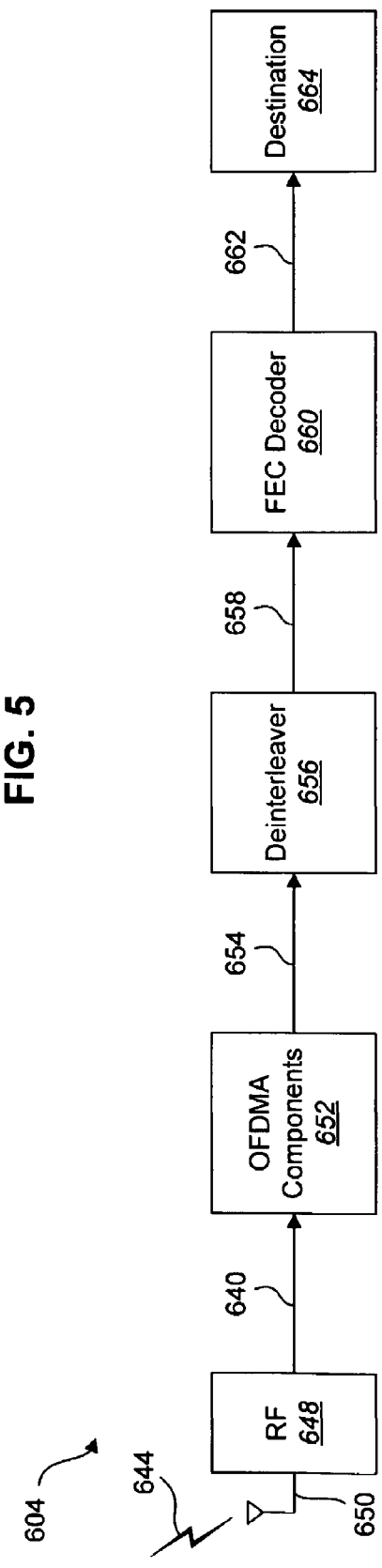
FIG. 6 illustrates various logical components that may be implemented in a user device that is configured to receive wireless communication signals over a downlink from a base station in accordance with OFDMA.

FIG. 6 illustrates various logical components that may be implemented in a user device 604 that is configured to receive wireless communication signals over a downlink from a base station 102 in accordance with OFDMA. The user device 604 that is shown in FIG. 6 includes an RF receiving unit 648. The RF receiving unit 648 includes a receive antenna 650 that receives an RF signal 644 that was transmitted by a base station 102. The RF signal 644 comprises an OFDMA signal 640. The RF receiving unit 648 performs RF processing on the RF signal 644 in order to recapture the OFDMA signal 640 that was transmitted.

The user device 604 shown in FIG. 6 also includes various components 652 that facilitate multiple access in accordance with OFDMA. These components 652 will be referred to as OFDMA components 652. The OFDMA components 652 in the user device 604 may correspond to the OFDMA components 538 in the base station 102 that transmitted the RF signal 644. The OFDMA components 652 in the user device 604 may include, for example, a serial-to-parallel converter, a plurality of sub-carrier demodulators (one for each sub-carrier), a fast fourier transform (FFT) unit, a parallel-to-serial converter, and so forth. The OFDMA components 652 output interleaved data 654.

The user device 604 also includes a deinterleaver 656. The interleaved data 654 that is output by the OFDMA components 652 is provided to the deinterleaver 656. The deinterleaver 656 deinterleaves the interleaved data 654 in accordance with a predetermined deinterleaving algorithm. The deinterleaving algorithm that is used may correspond to the interleaving algorithm that is used by the interleaver 534 in the base station 502 that transmitted the RF signal 644. The deinterleaver 656 outputs encoded data 658.

The user device 604 also includes an FEC decoder 660. The encoded data 658 that is output by the deinterleaver 656 is provided to the FEC decoder 660. The FEC decoder 660 performs FEC decoding on the encoded data 658 in accordance with a predetermined FEC decoding algorithm. The FEC decoding algorithm that is used by the FEC decoder 660 may correspond to the FEC encoding algorithm that is used by the FEC encoder 526 in the base station 502 that transmitted the RF signal 544. The data 662 that is output by the FEC decoder 660 is then provided to its intended destination 664.

As indicated above, an interleaver 534 interleaves coded data 532 that it receives from an FEC encoder 526. From a logical standpoint, it may be said that the coded data 532 is broken up into sets of coded bits, and the interleaver 534 performs interleaving operations on one set of coded bits at a time. That is, the interleaver 534 may perform an interleaving operation on one set of coded bits, then on a different set of coded bits, and so on.

In an OFDMA-based system like the one proposed for the UTRA downlink, the size of the sets of coded bits provided to the interleaver 534 may vary in direct relation to the transmission data rate. That is, a set of coded bits that is going to be transmitted at a higher data rate will be larger than a set of coded bits that is going to be transmitted at a lower data rate. An interleaver 534 that is capable of interleaving sets of coded bits of different sizes has not been proposed. In accordance with the techniques disclosed herein, an interleaver 534 may be capable of interleaving various sets of coded bits, even if they are not all the same size.

Figure 7:
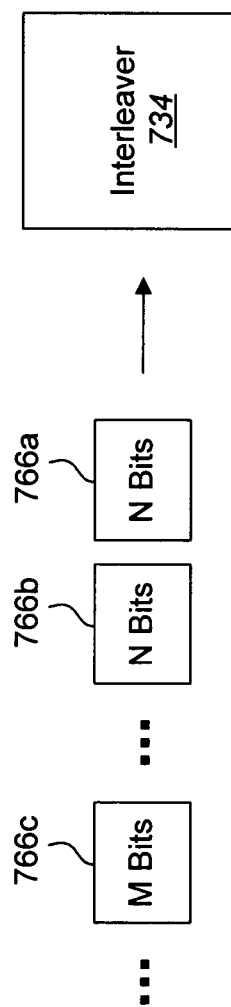
FIG. 7 illustrates an example showing differently sized sets of coded bits being provided to an interleaver.

FIG. 7 illustrates an example showing differently sized sets 766 of coded bits being provided to an interleaver 734. In the illustrated example, a first set 766a of N coded bits is provided to the interleaver 734, and the interleaver interleaves the first set 766a of coded bits. A second set 766b of N coded bits is also provided to the interleaver 734, and the interleaver 734 interleaves the second set 766b of N coded bits. Both the first set 766a of coded bits and the second set 766b of coded bits are transmitted at the same data rate. Thus, these sets 766a, 766b of coded bits are of the same size.

At some point in time after the second set 766b of N coded bits is interleaved, a set 766c of M coded bits is provided to the interleaver 734. In this example, M and N are both integers, and M is not equal to N. If M is greater than N, this means that the set 766c of M coded bits is transmitted at a higher data rate than either the first set 766a or the second set 766b of N coded bits. Conversely, if M is smaller than N, this means that the set 766c of M coded bits is transmitted at a lower data rate than either the first set 766a or the second set 766b of N coded bits.

Figure 8:
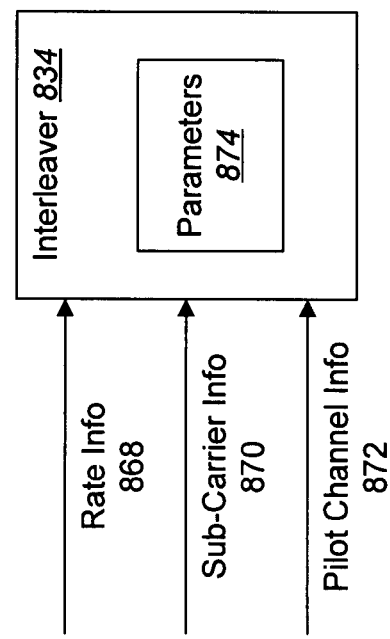
FIG. 8 illustrates different kinds of information that may be provided to and utilized by an interleaver in accordance with an embodiment.

FIG. 8 illustrates different kinds of information that may be provided to and utilized by an interleaver 834 in accordance with an embodiment. As shown in FIG. 8, transmission data rate information 868 may be provided to the interleaver 834. The transmission data rate information 868 may be the data rate at which the current set 766 of coded bits is being transmitted.

Sub-carrier information 870 may also be provided to the interleaver 834. The sub-carrier information 870 may include information about the number of sub-carriers that are assigned to transmit the current set 766 of coded bits that is being interleaved. The sub-carrier information 870 and the transmission data rate information 868 may be related.

Pilot channel information 872 may also be provided to the interleaver 834. The pilot channel information 872 may be information about how pilot channels 420 are multiplexed with other channels 422. An example of the pilot channel information 872 that may be provided to the interleaver 834 was discussed above in connection with FIG. 4.

In an exemplary embodiment, the interleaver 834 may be configured to interleave each set 766 of coded bits so as to randomize the coded bits in frequency across the same transmission timing interval (TTI) 318 excluding those sub-carriers for which pilot channels 420 are defined. The interleaver 834 may be configured to utilize the current transmission data rate information 868, sub-carrier information 870, and pilot channel information 872 in order to interleave the current set 766 of coded bits.

The interleaver 834 may be configured so that it performs the same steps regardless of the size of the set 766 of coded bits that is being interleaved. Even though the steps performed by the interleaver 834 may not change, the steps themselves may depend on various parameters 874 that may change. The parameters 874 may be adjusted based on the transmission data rate information 868, the sub-carrier information 870, and the pilot channel information 872.

In an alternative embodiment, the interleaver 834 may be configured to interleave across multiple TTIs 318. This may be done, for example, in embodiments where latency constraints are not severe. Where interleaving is done across a single TTI 318, a set 766 of coded bits that is provided to and interleaved by an interleaver 834 may correspond to a single TTI 318. Conversely, where interleaving is done across multiple TTIs 318, a set 766 of coded bits that is provided to and interleaved by an interleaver 834 may correspond to multiple TTIs 318.

FIG. 9 illustrates various parameters for a transmission scheme that has been proposed for the UTRA downlink. The parameters shown in FIG. 9 are taken from a 3GPP TSG RAN technical report entitled "Physical Layer Aspects for Evolved UTRA (Release 7)." This document is hereby incorporated by reference in its entirety.

FIG. 10 illustrates the number of coded bits per OFDM symbol for various transmission data rates. The values shown in FIG. 10 are computed based on the parameters shown in FIG. 9.

Figure 11:
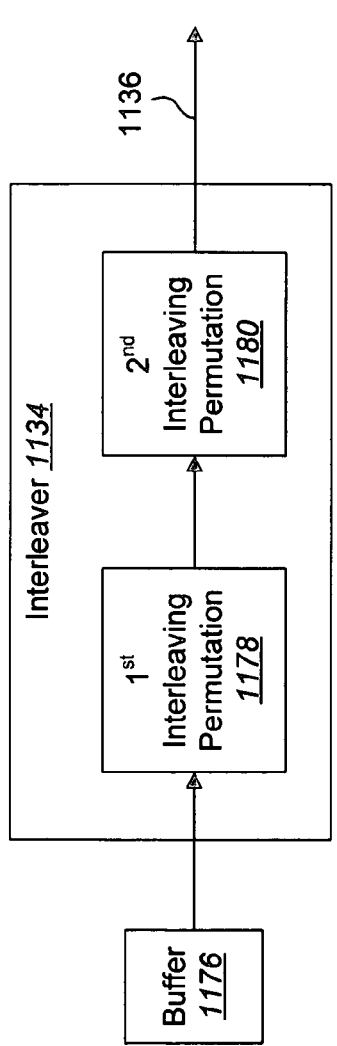
FIG. 11 illustrates an exemplary embodiment of an interleaver in accordance with the numerology provided in FIGS. 9-10.
Figure 12:
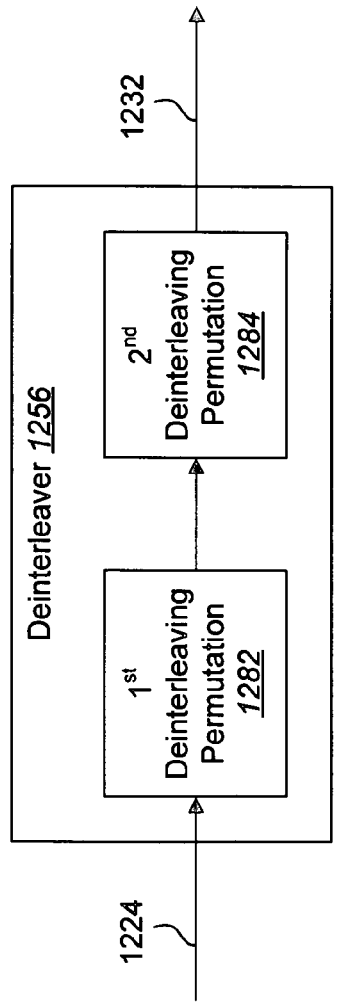
FIG. 12 illustrates an exemplary embodiment of a deinterleaver in accordance with the numerology provided in FIGS. 9-10.

An embodiment of an interleaving/deinterleaving structure based on the specific numerology that is presented in FIGS. 9-10 will now be described. FIG. 11 illustrates an exemplary embodiment of an interleaver 1134 in accordance with the numerology provided in FIGS. 9-10. FIG. 12 illustrates an exemplary embodiment of a deinterleaver 1256 in accordance with the numerology provided in FIGS. 9-10.

In the discussion that follows, the term $N_{chunk}$ refers to the number of bits per chunk 312 (with the number of sub-carriers per chunk 312 allocated via prior signaling). It will be assumed that $N_{chunk}$ is an integer sub-multiple of 300, in the most general formulation; multiples of 300 are also easily realized with the method disclosed herein. In general, the number of sub-carriers per chunk 312 would be an integer sub-multiple of the number of coded bits of the smallest transmission bandwidth.

The term $N_{BPSC}$ refers to the number of coded bits per sub-carrier. Thus $N_{BPSC}$ takes on values from 2, 4 or 6, for QPSK, 16QAM, and 64QAM, as exemplary. Of course, other modulations (e.g., 32QAM or 8QAM) are easily accommodated with this scheme as well.

The interleaver 1134 shown in FIG. 11 will now be discussed. A buffer 1176 includes $N_{Total}$ coded bits received from a forward error correction (FEC) encoder 526. The term $N_{Total}$ is defined as:

$$N_{Total} = N_{chunk} \times N_{BPSC} \quad (1)$$

A first interleaving permutation 1178 is performed on the $N_{Total}$ coded bits in the buffer 1176. The first interleaving permutation 1178 maps the sequence of the transmission buffer 1176 into non-overlapping sub-carriers. The term k will be used to denote the index of the FEC coded bits in the buffer 1176. The first interleaving permutation 1178 involves mapping the index k into an index i in accordance with equation 2:

$$i = int(N_{chunk}/N_1) \times (k \bmod N_1) + floor(k/N_1) \text{ for } k=0, \ldots, N_{chunk}-1 \quad (2)$$

The number $N_1$ may be any number that is a small sub-multiple than $N_{chunk}$ such that the index {k} is isomorphic to the resulting sequence {i}. As a particular example, $N_1$ can be 3 when a 1.25 MHz bandwidth is used, and any sub-multiple of 3 up to floor(W/1.25) when a W MHz bandwidth is used (W>1.25 MHz). The function floor(.) is the largest integer not exceeding its argument.

After the first interleaving permutation 1178, a second interleaving permutation 1180 is then performed on the $N_{Total}$ coded bits in the buffer 1176. The second interleaving permutation 1180 involves mapping the index i into an index j in accordance with equation 3:

$$j = (N_{BPSC}/2) \times floor(i/(N_{BPSC}/2)) + (i + N_{chunk} - floor(16 \times i/N_{chunk})) \bmod (N_{BPSC}/2) \text{ for } i=0, \ldots, N_{chunk}-1 \quad (3)$$

The second interleaving permutation 1180 ensures that that adjacent coded bits are mapped alternately onto less and more significant bits of a modulation constellation that is used to modulate the coded bits. In the depicted embodiment, the modulation constellation is assumed Gray-coded, as is common practice.

After the second interleaving permutation 1180 is performed, the interleaver 1134 outputs interleaved data 1136. The interleaved data 1136 may be provided to various OFDMA components 538 for additional OFDMA processing, as discussed above.

The deinterleaver 1256 shown in FIG. 12 will now be discussed. An OFDM symbol 1224 of length $N_{Total}$ is received.

A first deinterleaving permutation 1282 is performed on the bits in the OFDM symbol. The first deinterleaving permutation 1282 reverses the second interleaving permutation 1180 that is performed by the interleaver 1134. The term j will be used to denote the index of the bits in the OFDM symbol 1224. The first deinterleaving permutation 1282 involves mapping the index j into an index i in accordance with equation 4:

$$i=(N_{BPSC}/2)\times \text{floor}(j/N_{BPSC}/2)+(j+\text{floor}(16\times j/N_{chunk})) \mod(N_{BPSC}/2) \text{ for } j=0,\ldots,N_{chunk}-1 \quad (4)$$

After the first deinterleaving permutation 1282, a second deinterleaving permutation 1284 is then performed on the bits in the OFDM symbol 1224. The second deinterleaving permutation 1284 reverses the first interleaving permutation 1178 that is performed by the interleaver 534. The second deinterleaving permutation 1284 involves mapping the index i into an index in accordance with equation 5:

$$k=N_1\times i-(N_{chunk}-1)\text{floor}(N_1\times i/N_{chunk}) \text{ for } k=0,\ldots,N_{chunk}-1 \quad (5)$$

The term $N_1$ in equation 5 is as defined above in connection with equation 2. After the second deinterleaving permutation 1284 is performed, the deinterleaver 1256 outputs encoded data 1232. The encoded data 1232 may be provided to an FEC decoder 660, as above.

An example of the interleaving/deinterleaving structure discussed in connection with FIGS. 9-12 for a 1.25 MHz bandwidth, with 16QAM and 75 occupied sub-carriers is now provided:

| Coded bit order | Position After First Permute | Position After Second Permute |
|---|---|---|
| 0 | 0 | 0 |
| 1 | 200 | 203 |
| 2 | 400 | 406 |
| 3 | 1 | 1 |
| 4 | 201 | 204 |
| 5 | 401 | 407 |
| 6 | 2 | 2 |
| 7 | 202 | 205 |
| 8 | 402 | 400 |
| 9 | 3 | 3 |
| 10 | 203 | 206 |
| 11 | 403 | 401 |
| 12 | 4 | 4 |
| 13 | 204 | 207 |
| 14 | 404 | 402 |
| 15 | 5 | 5 |
| 16 | 205 | 200 |
| 17 | 405 | 403 |
| 18 | 6 | 6 |
| 19 | 206 | 201 |
| 20 | 406 | 404 |
| 21 | 7 | 7 |
| 22 | 207 | 202 |
| 23 | 407 | 405 |
| 24 | 8 | 8 |
| 25 | 208 | 211 |
| 26 | 408 | 414 |
| 27 | 9 | 9 |
| 28 | 209 | 212 |
| 29 | 409 | 415 |
| 30 | 10 | 10 |
| 31 | 210 | 213 |
| 32 | 410 | 408 |
| 33 | 11 | 11 |
| 34 | 211 | 214 |
| 35 | 411 | 409 |
| 36 | 12 | 12 |
| 37 | 212 | 215 |
| 38 | 412 | 410 |
| 39 | 13 | 13 |
| 40 | 213 | 208 |
| 41 | 413 | 410 |
| 42 | 14 | 14 |
| 43 | 214 | 209 |
| 44 | 414 | 411 |
| 45 | 15 | 15 |
| 46 | 215 | 210 |
| 47 | 415 | 412 |
| 48 | 16 | 16 |
| 49 | 216 | 219 |
| 50 | 416 | 421 |
| 51 | 17 | 17 |
| 52 | 217 | 220 |
| 53 | 417 | 422 |
| 54 | 18 | 18 |
| 55 | 218 | 221 |
| 56 | 418 | 423 |
| 57 | 19 | 19 |
| 58 | 219 | 222 |
| 59 | 419 | 416 |
| 60 | 20 | 20 |
| 61 | 220 | 223 |
| 62 | 420 | 417 |
| 63 | 21 | 21 |
| 64 | 221 | 216 |
| 65 | 421 | 418 |
| 66 | 22 | 22 |
| 67 | 222 | 217 |
| 68 | 422 | 419 |
| 69 | 23 | 23 |
| 70 | 223 | 218 |
| 71 | 423 | 420 |
| 72 | 24 | 24 |
| 73 | 224 | 227 |
| 74 | 424 | 429 |
| 75 | 25 | 25 |
| 76 | 225 | 227 |
| 77 | 425 | 430 |
| 78 | 26 | 26 |
| 79 | 226 | 228 |
| 80 | 426 | 431 |
| 81 | 27 | 27 |
| 82 | 227 | 229 |
| 83 | 427 | 424 |
| 84 | 28 | 28 |
| 85 | 228 | 230 |
| 86 | 428 | 425 |
| 87 | 29 | 29 |
| 88 | 229 | 231 |
| 89 | 429 | 426 |
| 90 | 30 | 30 |
| 91 | 230 | 224 |
| 92 | 430 | 427 |
| 93 | 31 | 31 |
| 94 | 231 | 225 |
| 95 | 431 | 428 |

-continued

| Coded bit order | Position After First Permute | Position After Second Permute |
|---|---|---|
| 96 | 32 | 32 |
| 97 | 232 | 234 |
| 98 | 432 | 437 |
| 99 | 33 | 33 |
| 100 | 233 | 235 |
| 101 | 433 | 438 |
| 102 | 34 | 34 |
| 103 | 234 | 236 |
| 104 | 434 | 439 |
| 105 | 35 | 35 |
| 106 | 235 | 237 |
| 107 | 435 | 432 |
| 108 | 36 | 36 |
| 109 | 236 | 238 |
| 110 | 436 | 433 |
| 111 | 37 | 37 |
| 112 | 237 | 239 |
| 113 | 437 | 434 |
| 114 | 38 | 37 |
| 115 | 238 | 232 |
| 116 | 438 | 435 |
| 117 | 39 | 38 |
| 118 | 239 | 233 |
| 119 | 439 | 436 |
| 120 | 40 | 47 |
| 121 | 240 | 242 |
| 122 | 440 | 445 |
| 123 | 41 | 40 |
| 124 | 241 | 243 |
| 125 | 441 | 446 |
| 126 | 42 | 41 |
| 127 | 242 | 244 |
| 128 | 442 | 447 |
| 129 | 43 | 42 |
| 130 | 243 | 245 |
| 131 | 443 | 440 |
| 132 | 44 | 43 |
| 133 | 244 | 246 |
| 134 | 444 | 441 |
| 135 | 45 | 44 |
| 136 | 245 | 247 |
| 137 | 445 | 442 |
| 138 | 46 | 45 |
| 139 | 246 | 240 |
| 140 | 446 | 443 |
| 141 | 47 | 46 |
| 142 | 247 | 241 |
| 143 | 447 | 444 |
| 144 | 48 | 55 |
| 145 | 248 | 250 |
| 146 | 448 | 453 |
| 147 | 49 | 48 |
| 148 | 249 | 251 |
| 149 | 449 | 454 |
| 150 | 50 | 49 |
| 151 | 250 | 252 |
| 152 | 450 | 454 |
| 153 | 51 | 50 |
| 154 | 251 | 253 |
| 155 | 451 | 455 |
| 156 | 52 | 51 |
| 157 | 252 | 254 |
| 158 | 452 | 448 |
| 159 | 53 | 52 |
| 160 | 253 | 255 |
| 161 | 453 | 449 |
| 162 | 54 | 53 |
| 163 | 254 | 248 |
| 164 | 454 | 450 |
| 165 | 55 | 54 |
| 166 | 255 | 249 |
| 167 | 455 | 451 |
| 168 | 56 | 63 |
| 169 | 256 | 258 |
| 170 | 456 | 460 |
| 171 | 57 | 56 |
| 172 | 257 | 259 |
| 173 | 457 | 461 |
| 174 | 58 | 57 |
| 175 | 258 | 260 |
| 176 | 458 | 462 |
| 177 | 59 | 58 |
| 178 | 259 | 261 |
| 179 | 459 | 463 |
| 180 | 60 | 59 |
| 181 | 260 | 262 |
| 182 | 460 | 456 |
| 183 | 61 | 60 |
| 184 | 261 | 263 |
| 185 | 461 | 457 |
| 186 | 62 | 61 |
| 187 | 262 | 256 |
| 188 | 462 | 458 |
| 189 | 63 | 62 |
| 190 | 263 | 256 |
| 191 | 463 | 459 |
| 192 | 64 | 71 |
| 193 | 264 | 265 |
| 194 | 464 | 468 |
| 195 | 65 | 64 |
| 196 | 265 | 266 |
| 197 | 465 | 469 |
| 198 | 66 | 65 |
| 199 | 266 | 267 |
| 200 | 466 | 470 |
| 201 | 67 | 66 |
| 202 | 267 | 268 |
| 203 | 467 | 471 |
| 204 | 68 | 67 |
| 205 | 268 | 269 |
| 206 | 468 | 464 |
| 207 | 69 | 68 |
| 208 | 269 | 270 |
| 209 | 469 | 465 |
| 210 | 70 | 69 |
| 211 | 270 | 271 |
| 212 | 470 | 466 |
| 213 | 71 | 70 |
| 214 | 271 | 264 |
| 215 | 471 | 467 |
| 216 | 72 | 79 |
| 217 | 272 | 273 |
| 218 | 472 | 476 |
| 219 | 73 | 72 |
| 220 | 273 | 274 |
| 221 | 473 | 477 |
| 222 | 74 | 73 |
| 223 | 274 | 275 |
| 224 | 474 | 478 |
| 225 | 75 | 73 |
| 226 | 275 | 276 |
| 227 | 475 | 479 |
| 228 | 76 | 74 |
| 229 | 276 | 277 |
| 230 | 476 | 472 |
| 231 | 77 | 75 |
| 232 | 277 | 278 |
| 233 | 477 | 473 |
| 234 | 78 | 76 |
| 235 | 278 | 279 |
| 236 | 478 | 474 |
| 237 | 79 | 77 |
| 238 | 279 | 272 |
| 239 | 479 | 475 |
| 240 | 80 | 86 |
| 241 | 280 | 281 |
| 242 | 480 | 484 |
| 243 | 81 | 87 |

-continued

| Coded bit order | Position After First Permute | Position After Second Permute |
|---|---|---|
| 244 | 281 | 282 |
| 245 | 481 | 485 |
| 246 | 82 | 80 |
| 247 | 282 | 283 |
| 248 | 482 | 486 |
| 249 | 83 | 81 |
| 250 | 283 | 284 |
| 251 | 483 | 487 |
| 252 | 84 | 82 |
| 253 | 284 | 285 |
| 254 | 484 | 480 |
| 255 | 85 | 83 |
| 256 | 285 | 286 |
| 257 | 485 | 481 |
| 258 | 86 | 84 |
| 259 | 286 | 287 |
| 260 | 486 | 482 |
| 261 | 87 | 85 |
| 262 | 287 | 280 |
| 263 | 487 | 483 |
| 264 | 88 | 94 |
| 265 | 288 | 289 |
| 266 | 488 | 491 |
| 267 | 89 | 95 |
| 268 | 289 | 290 |
| 269 | 489 | 492 |
| 270 | 90 | 88 |
| 271 | 290 | 291 |
| 272 | 490 | 493 |
| 273 | 91 | 89 |
| 274 | 291 | 292 |
| 275 | 491 | 494 |
| 276 | 92 | 90 |
| 277 | 292 | 293 |
| 278 | 492 | 495 |
| 279 | 93 | 91 |
| 280 | 293 | 294 |
| 281 | 493 | 488 |
| 282 | 94 | 92 |
| 283 | 294 | 295 |
| 284 | 494 | 489 |
| 285 | 95 | 93 |
| 286 | 295 | 288 |
| 287 | 495 | 490 |
| 288 | 96 | 102 |
| 289 | 296 | 297 |
| 290 | 496 | 499 |
| 291 | 97 | 103 |
| 292 | 297 | 298 |
| 293 | 497 | 500 |
| 294 | 98 | 96 |
| 295 | 298 | 299 |
| 296 | 498 | 501 |
| 297 | 99 | 97 |
| 298 | 299 | 300 |
| 299 | 499 | 502 |
| 300 | 100 | 98 |
| 301 | 300 | 300 |
| 302 | 500 | 503 |
| 303 | 101 | 99 |
| 304 | 301 | 301 |
| 305 | 501 | 496 |
| 306 | 102 | 100 |
| 307 | 302 | 302 |
| 308 | 502 | 497 |
| 309 | 103 | 101 |
| 310 | 303 | 303 |
| 311 | 503 | 498 |
| 312 | 104 | 110 |
| 313 | 304 | 304 |
| 314 | 504 | 507 |
| 315 | 105 | 111 |
| 316 | 305 | 305 |
| 317 | 505 | 508 |
| 318 | 106 | 104 |
| 319 | 306 | 306 |
| 320 | 506 | 509 |
| 321 | 107 | 105 |
| 322 | 307 | 307 |
| 323 | 507 | 510 |
| 324 | 108 | 106 |
| 325 | 308 | 308 |
| 326 | 508 | 511 |
| 327 | 109 | 107 |
| 328 | 309 | 309 |
| 329 | 509 | 504 |
| 330 | 110 | 108 |
| 331 | 310 | 310 |
| 332 | 510 | 505 |
| 333 | 111 | 109 |
| 334 | 311 | 311 |
| 335 | 511 | 506 |
| 336 | 112 | 118 |
| 337 | 312 | 312 |
| 338 | 512 | 515 |
| 339 | 113 | 118 |
| 340 | 313 | 313 |
| 341 | 513 | 516 |
| 342 | 114 | 119 |
| 343 | 314 | 314 |
| 344 | 514 | 517 |
| 345 | 115 | 112 |
| 346 | 315 | 315 |
| 347 | 515 | 518 |
| 348 | 116 | 113 |
| 349 | 316 | 316 |
| 350 | 516 | 519 |
| 351 | 117 | 114 |
| 352 | 317 | 317 |
| 353 | 517 | 512 |
| 354 | 118 | 115 |
| 355 | 318 | 318 |
| 356 | 518 | 513 |
| 357 | 119 | 116 |
| 358 | 319 | 319 |
| 359 | 519 | 514 |
| 360 | 120 | 125 |
| 361 | 320 | 320 |
| 362 | 520 | 523 |
| 363 | 121 | 126 |
| 364 | 321 | 321 |
| 365 | 521 | 524 |
| 366 | 122 | 127 |
| 367 | 322 | 322 |
| 368 | 522 | 525 |
| 369 | 123 | 120 |
| 370 | 323 | 323 |
| 371 | 523 | 526 |
| 372 | 124 | 121 |
| 373 | 324 | 324 |
| 374 | 524 | 527 |
| 375 | 125 | 122 |
| 376 | 325 | 325 |
| 377 | 525 | 527 |
| 378 | 126 | 123 |
| 379 | 326 | 326 |
| 380 | 526 | 520 |
| 381 | 127 | 124 |
| 382 | 327 | 327 |
| 383 | 527 | 521 |
| 384 | 128 | 133 |
| 385 | 328 | 328 |
| 386 | 528 | 530 |
| 387 | 129 | 134 |
| 388 | 329 | 329 |
| 389 | 529 | 531 |
| 390 | 130 | 135 |
| 391 | 330 | 330 |

-continued

| Coded bit order | Position After First Permute | Position After Second Permute |
|---|---|---|
| 392 | 530 | 532 |
| 393 | 131 | 128 |
| 394 | 331 | 331 |
| 395 | 531 | 533 |
| 396 | 132 | 129 |
| 397 | 332 | 332 |
| 398 | 532 | 534 |
| 399 | 133 | 130 |
| 400 | 333 | 333 |
| 401 | 533 | 535 |
| 402 | 134 | 131 |
| 403 | 334 | 334 |
| 404 | 534 | 528 |
| 405 | 135 | 132 |
| 406 | 335 | 335 |
| 407 | 535 | 529 |
| 408 | 136 | 141 |
| 409 | 336 | 336 |
| 410 | 536 | 538 |
| 411 | 137 | 142 |
| 412 | 337 | 337 |
| 413 | 537 | 539 |
| 414 | 138 | 143 |
| 415 | 338 | 337 |
| 416 | 538 | 540 |
| 417 | 139 | 136 |
| 418 | 339 | 338 |
| 419 | 539 | 541 |
| 420 | 140 | 137 |
| 421 | 340 | 339 |
| 422 | 540 | 542 |
| 423 | 141 | 138 |
| 424 | 341 | 340 |
| 425 | 541 | 543 |
| 426 | 142 | 139 |
| 427 | 342 | 341 |
| 428 | 542 | 536 |
| 429 | 143 | 140 |
| 430 | 343 | 342 |
| 431 | 543 | 537 |
| 432 | 144 | 149 |
| 433 | 344 | 351 |
| 434 | 544 | 546 |
| 435 | 145 | 150 |
| 436 | 345 | 344 |
| 437 | 545 | 547 |
| 438 | 146 | 151 |
| 439 | 346 | 345 |
| 440 | 546 | 548 |
| 441 | 147 | 144 |
| 442 | 347 | 346 |
| 443 | 547 | 549 |
| 444 | 148 | 145 |
| 445 | 348 | 347 |
| 446 | 548 | 550 |
| 447 | 149 | 146 |
| 448 | 349 | 348 |
| 449 | 549 | 551 |
| 450 | 150 | 146 |
| 451 | 350 | 349 |
| 452 | 550 | 544 |
| 453 | 151 | 147 |
| 454 | 351 | 350 |
| 455 | 551 | 545 |
| 456 | 152 | 156 |
| 457 | 352 | 359 |
| 458 | 552 | 554 |
| 459 | 153 | 157 |
| 460 | 353 | 352 |
| 461 | 553 | 555 |
| 462 | 154 | 158 |
| 463 | 354 | 353 |
| 464 | 554 | 556 |
| 465 | 155 | 159 |

-continued

| Coded bit order | Position After First Permute | Position After Second Permute |
|---|---|---|
| 466 | 355 | 354 |
| 467 | 555 | 557 |
| 468 | 156 | 152 |
| 469 | 356 | 355 |
| 470 | 556 | 558 |
| 471 | 157 | 153 |
| 472 | 357 | 356 |
| 473 | 557 | 559 |
| 474 | 158 | 154 |
| 475 | 358 | 357 |
| 476 | 558 | 552 |
| 477 | 159 | 155 |
| 478 | 359 | 358 |
| 479 | 559 | 553 |
| 480 | 160 | 164 |
| 481 | 360 | 367 |
| 482 | 560 | 562 |
| 483 | 161 | 165 |
| 484 | 361 | 360 |
| 485 | 561 | 563 |
| 486 | 162 | 166 |
| 487 | 362 | 361 |
| 488 | 562 | 564 |
| 489 | 163 | 167 |
| 490 | 363 | 362 |
| 491 | 563 | 564 |
| 492 | 164 | 160 |
| 493 | 364 | 363 |
| 494 | 564 | 565 |
| 495 | 165 | 161 |
| 496 | 365 | 364 |
| 497 | 565 | 566 |
| 498 | 166 | 162 |
| 499 | 366 | 365 |
| 500 | 566 | 567 |
| 501 | 167 | 163 |
| 502 | 367 | 366 |
| 503 | 567 | 560 |
| 504 | 168 | 172 |
| 505 | 368 | 375 |
| 506 | 568 | 569 |
| 507 | 169 | 173 |
| 508 | 369 | 368 |
| 509 | 569 | 570 |
| 510 | 170 | 174 |
| 511 | 370 | 369 |
| 512 | 570 | 571 |
| 513 | 171 | 175 |
| 514 | 371 | 370 |
| 515 | 571 | 572 |
| 516 | 172 | 168 |
| 517 | 372 | 371 |
| 518 | 572 | 573 |
| 519 | 173 | 169 |
| 520 | 373 | 372 |
| 521 | 573 | 574 |
| 522 | 174 | 170 |
| 523 | 374 | 373 |
| 524 | 574 | 575 |
| 525 | 175 | 171 |
| 526 | 375 | 373 |
| 527 | 575 | 568 |
| 528 | 176 | 180 |
| 529 | 376 | 382 |
| 530 | 576 | 577 |
| 531 | 177 | 181 |
| 532 | 377 | 383 |
| 533 | 577 | 578 |
| 534 | 178 | 182 |
| 535 | 378 | 376 |
| 536 | 578 | 579 |
| 537 | 179 | 183 |
| 538 | 379 | 377 |
| 539 | 579 | 580 |

-continued

| Coded bit order | Position After First Permute | Position After Second Permute |
|---|---|---|
| 540 | 180 | 176 |
| 541 | 380 | 378 |
| 542 | 580 | 581 |
| 543 | 181 | 177 |
| 544 | 381 | 379 |
| 545 | 581 | 582 |
| 546 | 182 | 178 |
| 547 | 382 | 380 |
| 548 | 582 | 583 |
| 549 | 183 | 179 |
| 550 | 383 | 381 |
| 551 | 583 | 576 |
| 552 | 184 | 188 |
| 553 | 384 | 390 |
| 554 | 584 | 585 |
| 555 | 185 | 189 |
| 556 | 385 | 391 |
| 557 | 585 | 586 |
| 558 | 186 | 190 |
| 559 | 386 | 384 |
| 560 | 586 | 587 |
| 561 | 187 | 191 |
| 562 | 387 | 385 |
| 563 | 587 | 588 |
| 564 | 188 | 191 |
| 565 | 388 | 386 |
| 566 | 588 | 589 |
| 567 | 189 | 184 |
| 568 | 389 | 387 |
| 569 | 589 | 590 |
| 570 | 190 | 185 |
| 571 | 390 | 388 |
| 572 | 590 | 591 |
| 573 | 191 | 186 |
| 574 | 391 | 389 |
| 575 | 591 | 584 |
| 576 | 192 | 195 |
| 577 | 392 | 398 |
| 578 | 592 | 593 |
| 579 | 193 | 196 |
| 580 | 393 | 399 |
| 581 | 593 | 594 |
| 582 | 194 | 197 |
| 583 | 394 | 392 |
| 584 | 594 | 595 |
| 585 | 195 | 198 |
| 586 | 395 | 393 |
| 587 | 595 | 596 |
| 588 | 196 | 199 |
| 589 | 396 | 394 |
| 590 | 596 | 597 |
| 591 | 197 | 192 |
| 592 | 397 | 395 |
| 593 | 597 | 598 |
| 594 | 198 | 193 |
| 595 | 398 | 396 |
| 596 | 598 | 599 |
| 597 | 199 | 194 |
| 598 | 399 | 397 |
| 599 | 599 | 592 |

Figure 13:
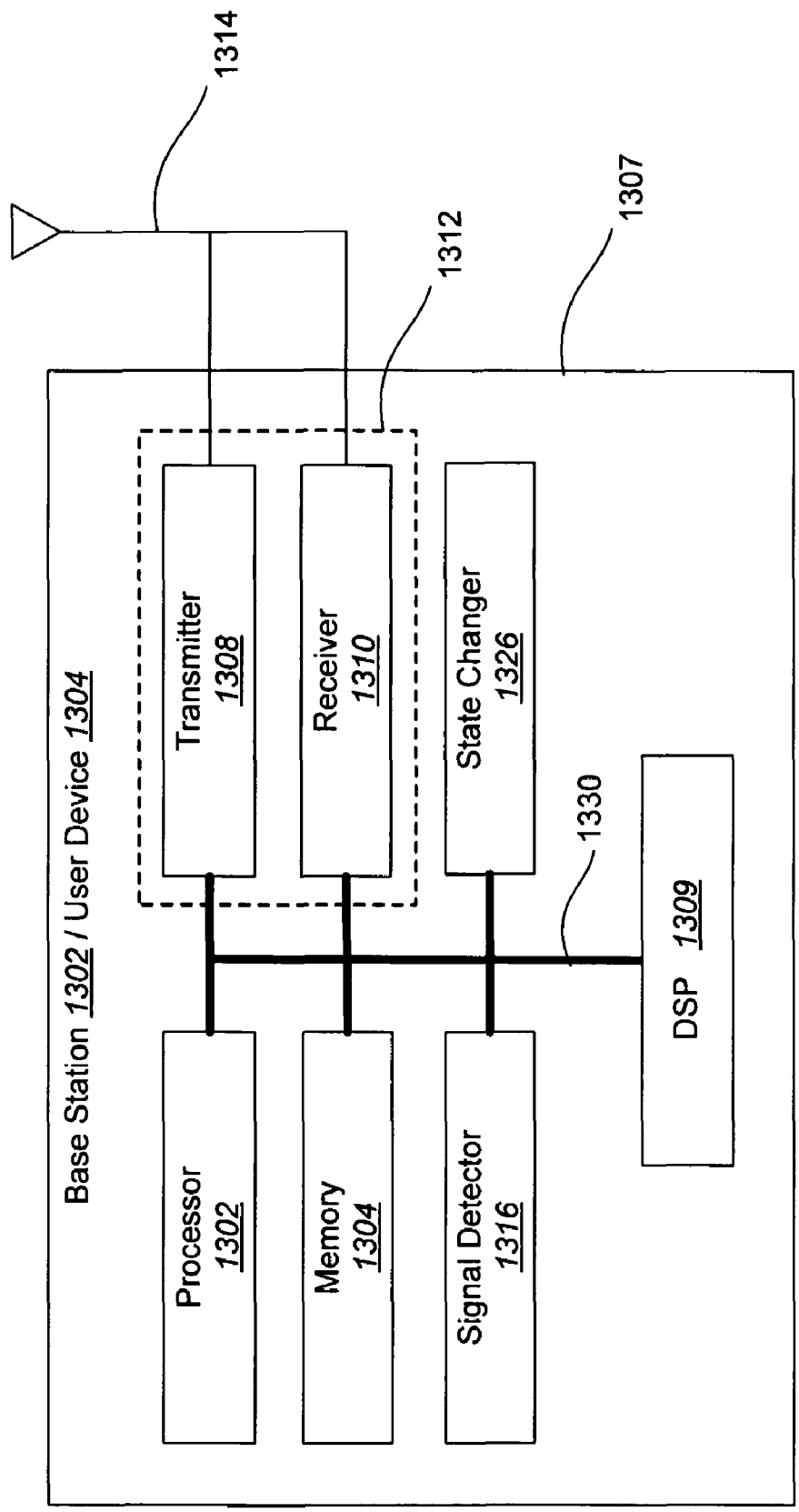
FIG. 13 illustrates various components that may be utilized in a base station and/or a user device.

FIG. 13 illustrates various components that may be utilized in a base station 1302 and/or a user device 1304. The base station 1302 and/or user device 1304 includes a processor 1302 which controls operation of the base station 1302 and/or user device 1304. The processor 1302 may also be referred to as a CPU. Memory 1304, which may include both read-only memory (ROM) and random access memory (RAM), provides instructions and data to the processor 1302. A portion of the memory 1304 may also include non-volatile random access memory (NVRAM).

The base station 1302 and/or user device 1304 may also include a housing 1307 that contains a transmitter 1308 and a receiver 1310 to allow transmission and reception of data. The transmitter 1308 and receiver 1310 may be combined into a transceiver 1312. An antenna 1314 is attached to the housing 1307 and electrically coupled to the transceiver 1312. Additional antennas (not shown) may also be used.

The base station 1302 and/or user device 1304 may also include a signal detector 1316 used to detect and quantify the level of signals received by the transceiver 1312. The signal detector 1316 detects such signals as total energy, pilot energy per pseudonoise (PN) chips, power spectral density, and other signals.

A state changer 1313 of the base station 1302 and/or user device 1304 controls the state of the wireless communication device based on a current state and additional signals received by the transceiver 1312 and detected by the signal detector 1316. The base station 1302 and/or user device 1304 may be capable of operating in any one of a number of states.

The various components of the base station 1302 and/or user device 1304 are coupled together by a bus system 1330 which may include a power bus, a control signal bus, and a status signal bus in addition to a data bus. However, for the sake of clarity, the various buses are illustrated in FIG. 13 as the bus system 1330. The base station 1302 and/or user device 1304 may also include a digital signal processor (DSP) 1309 for use in processing signals. One skilled in the art will appreciate that the base station 1302 and/or user device 1304 illustrated in FIG. 13 is a functional block diagram rather than a listing of specific components.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A base station that is configured to interleave coded data in an OFDMA-based system that uses a varying number of sub-carriers for channel transmission, comprising:
    an antenna for transmitting signals on a downlink to a plurality of user devices;
    a processor;
    memory in electronic communication with the processor;
    interleaving instructions stored in the memory, the interleaving instructions being executable by the processor to interleave coded data in accordance with an interleaving algorithm in order to generate interleaved data, wherein the interleaving algorithm is configured to accommodate use of different transmission bandwidths for data transmission; and
    OFDMA processing instructions stored in the memory, the OFDMA processing instructions being executable by the processor to perform OFDMA processing on the interleaved data, wherein the OFDMA processing facilitates the use of a varying number of sub-carriers for channel transmission so that different users that are transmitting at the same time are assigned different numbers of sub-carriers and so that the number of sub-carriers that are assigned to a particular user changes over time.

2. The base station of claim 1, wherein interleaving the coded data comprises pseudo-randomly and uniformly distributing coded bits within the coded data across a plurality of sub-carriers that have been designated for transmission of the coded data.

3. The base station of claim 1, wherein interleaving the coded data comprises ensuring that no coded bits of the coded data are mapped into a transmission timing interval and a sub-carrier that are reserved for a pilot channel.

4. The base station of claim 1, wherein the interleaving is performed on sets of coded data having different lengths.

5. The base station of claim 1, wherein the interleaving algorithm comprises one or more parameters whose value depends on at least one of transmission data rate information, sub-carrier information, and pilot channel information.

6. The base station of claim 1, wherein different OFDM symbols transmitted in accordance with the OFDMA-based system comprise different numbers of coded bits.

7. The base station of claim 1, wherein interleaving a set of coded data comprises performing an interleaving permutation on the set of coded data that maps adjacent coded bits of the set of coded data into non-overlapping sub-carriers.

8. The base station of claim 7, wherein an index k denotes an index for a sequence of $N_{Total}$ coded bits of the coded data, wherein performing the first interleaving permutation comprises mapping the index k into an index i, wherein the index i is defined as $i = \text{int}(N_{chunk}/N_1) \times (k \bmod N_1) + \text{floor}(k/N_1)$ for $k=0, \ldots, N_{chunk}-1$, wherein sub-carriers of the OFDMA-based system are divided into a plurality of chunks, wherein $N_{chunk}$ is a coded bits per chunk parameter, and wherein $N_1$ is any number that is a small sub-multiple than $N_{chunk}$ such that the index $\{k\}$ is isomorphic to the resulting sequence $\{i\}$.

9. The base station of claim 1, wherein interleaving a set of coded data comprises performing an interleaving permutation on the set of coded data that maps adjacent coded bits of the set of coded data onto less and more significant bits of a modulation constellation that is used to modulate the coded data.

10. The base station of claim 9, wherein an index i denotes an index for the set of coded bits after the first interleaving permutation is performed, and wherein performing the second interleaving permutation comprises mapping the index i into an index j, wherein the index j is defined as $j = (N_{BPSC}/2) \times \text{floor}(i/(N_{BPSC}/2)) + (i + N_{chunk} - \text{floor}(16 \times i / N_{chunk})) \bmod (N_{BPSC}/2)$ for $i=0, \ldots, N_{chunk}-1$, wherein sub-carriers of the OFDMA-based system are divided into a plurality of chunks, wherein $N_{chunk}$ is a coded bits per chunk parameter, and wherein $N_{BPSC}$ is a coded bits per sub-carrier parameter.

11. A user device that is configured to deinterleave coded data in an OFDMA-based system that uses a varying number of sub-carriers for channel transmission, comprising:
    an antenna for receiving signals on a downlink from a base station;
    a processor;
    memory in electronic communication with the processor;
    OFDMA processing instructions stored in the memory, the OFDMA processing instructions being executable by the processor to perform OFDMA processing on the received data in order to generate interleaved data, wherein the OFDMA processing facilitates the use of a varying number of sub-carriers for channel transmission so that different users that are transmitting at the same time are assigned different numbers of sub-carriers and so that the number of sub-carriers that are assigned to a particular user changes over time; and
    deinterleaving instructions stored in the memory, the deinterleaving instructions being executable by the processor to deinterleave the interleaved data in accordance with a deinterleaving algorithm in order to generate encoded data, wherein the deinterleaving algorithm is configured to accommodate use of different transmission bandwidths for data transmission.

12. The user device of claim 11, wherein the interleaved data comprises the coded data pseudo-randomly and uniformly distributed across a plurality of sub-carriers that have been designated for transmission of the coded data.

13. The user device of claim 11, wherein the received data comprises OFDM symbols having different lengths.

14. The user device of claim 11, wherein the deinterleaving algorithm comprises one or more parameters whose value depends on at least one of transmission data rate information, sub-carrier information, and pilot channel information.

15. The user device of claim 11, wherein deinterleaving the received data comprises performing a first deinterleaving permutation on the received data, wherein the first deinterleaving permutation reverses a second interleaving permutation that maps adjacent coded bits of a set of coded data onto less and more significant bits of a modulation constellation.

16. The user device of claim 15, wherein an index j denotes an index for a sequence of $N_{Total}$ bits of the received data, wherein deinterleaving the received data comprises mapping the index j into an index i, wherein the index i is defined as $i=(N_{BPSC}/2) \times floor(j/N_{BPSC}/2)+(j+floor(16 \times j/N_{chunk})) \mod(N_{BPSC}/2)$ for $j=0, \ldots, N_{chunk}-1$, wherein sub-carriers of the OFDMA-based system are divided into a plurality of chunks, wherein $N_{chunk}$ is a coded bits per chunk parameter, and wherein $N_{BPSC}$ is a coded bits per sub-carrier parameter.

17. The base station of claim 15, wherein deinterleaving the received data comprises performing a second deinterleaving permutation on the received data, wherein the second deinterleaving permutation reverses a first interleaving permutation that maps adjacent coded bits of the set of coded data into non-overlapping sub-carriers.

18. The user device of claim 17, wherein an index i denotes an index for the set of coded bits after the first deinterleaving permutation is performed, and wherein performing the second deinterleaving permutation comprises mapping the index i into an index k, wherein the index k is defined $k=N_1 \times i-(N_{chunk}-1)floor(N_1 \times i/N_{chunk})$ for $k=0, \ldots, N_{chunk}-1$, wherein sub-carriers of the OFDMA-based system are divided into a plurality of chunks, wherein $N_{chunk}$ is a coded bits per chunk parameter, and wherein $N_1$ is any number that is a small sub-multiple than $N_{chunk}$ such that the index $\{i\}$ is isomorphic to the resulting sequence $\{k\}$.

* * * * *

UNITED STATES PATENT AND TRADEMARK OFFICE
CERTIFICATE OF CORRECTION

PATENT NO. : 7,681,092 B2  Page 1 of 1
APPLICATION NO. : 11/401662
DATED : March 16, 2010
INVENTOR(S) : John M. Kowalski It is certified that error appears in the above-identified patent and that said Letters Patent is hereby corrected as shown below:

In column 9, line 38 please delete "660, as above" and replace it with
--660, as discussed above--.

Signed and Sealed this

Third Day of August, 2010

David J. Kappos
*Director of the United States Patent and Trademark Office*